(No Model.)
H. D. ROBINSON.
FENCE MACHINE REEL.
No. 496,283.  Patented Apr. 25, 1893.
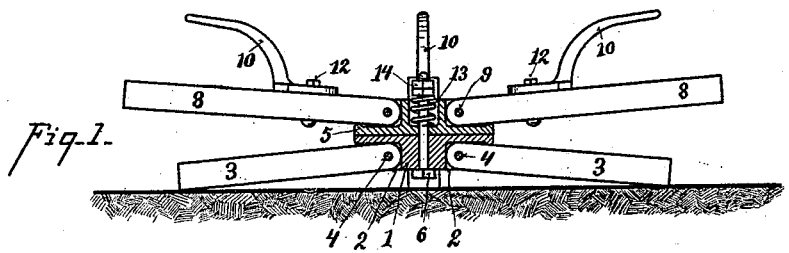
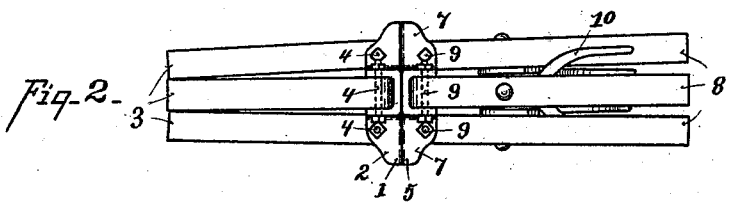
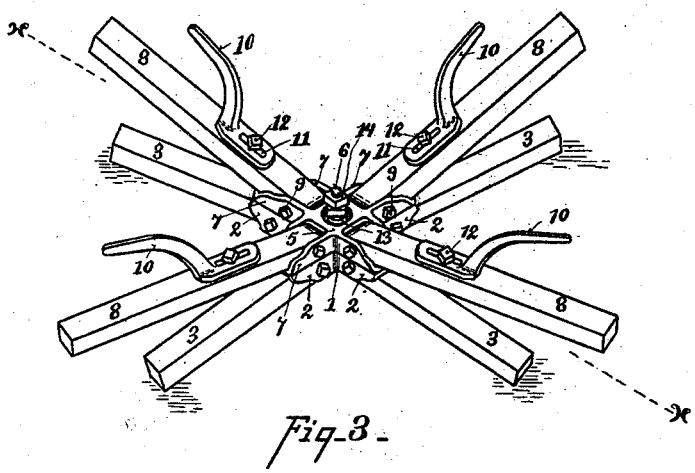
Witnesses
C. W. Miles
O. Kaiser
Inventor
Henry D. Robinson
By Wood & Boyd
Attorneys

UNITED STATES PATENT OFFICE.

HENRY D. ROBINSON, OF RICHMOND, INDIANA.

FENCE-MACHINE REEL.

SPECIFICATION forming part of Letters Patent No. 496,283, dated April 25, 1893.

Application filed September 16, 1892. Serial No. 446,087. (No model.)

*To all whom it may concern:*

Be it known that I, HENRY D. ROBINSON, a citizen of the United States, residing at Richmond, in the county of Wayne and State of Indiana, have invented certain new and useful Improvements in Fence-Machine Reels, of which the following is a specification.

My invention relates to a portable reel adapted primarily to support and deliver the wire to a wire fence machine.

The object of the invention is to provide a device which can be easily folded and transported, and readily set up in position.

Another object of the invention is to provide suitable tension controlling the speed of the reel.

The various features of my invention are fully set forth in the description of the accompanying drawings making a part of this specification, in which—

Figure 1 is a section on line $x, x$, Fig. 3. Fig. 2 is an elevation of the device in the folded condition. Fig. 3 is a perspective view of the device in position for use.

1 represents the base plate of the machine; it is preferably provided with four open sockets 2 on the under side.

3 represents supporting arms. 4 shows pivots in the open sockets 2 upon which said arms 3 hinge. When in the position shown in Fig. 1 these arms rest upon the ground, and the top of the base plate rests upon these arms, and is suspended above the ground. This is for convenience of setting the machine in a steady position on uneven ground.

5 represents the turn-plate; it journals upon the king-bolt or pivot pin 6, and is provided preferably with open sockets or ears 7.

8 represents the reel arms which are secured within the ears or open sockets 7 by pivots 9.

10 represents fingers for holding the coil of wire in position; they are adjustably secured to the arms 8 by means of the slot 11 in the shank, and set screw 12 passing through said slot and arms.

It is necessary to control the speed of the reel by the tension device, so as to prevent the wire from paying out too freely; for this purpose I have provided a housing on the top of the turn plate in which is placed a coiled spring 13.

14 represents set nuts by means of which the tension of the spring is adjusted for increasing or diminishing the friction between the turn plate 5 and the base plate 1, so that the turn plate may be caused to turn with greater or less freedom.

It will be observed that the supporting arms 3 are hinged so as to move in one direction, and the reel arms 8 are hinged so as to move in the opposite direction, so that when folded in position shown in Fig. 2, they occupy a small compass and can be readily secured in that position for transportation, and quickly unfolded when desired for use.

Having described my invention, what I claim is—

1. A wire reel for fence machines, consisting of the base plate 1 having sockets 2, the folding arms 3 pivoted to the sockets of the base plate, the turn plate 5 resting upon supported by and turning on the base plate and having the sockets 7, and the reel arms 8 having coil-holding fingers 10 pivoted to the sockets of the turn plate, substantially as described.

2. A wire reel for fence machines, consisting of a base plate 1 provided with supporting arms 3, the turn plate 5 resting on the base plate and provided with pivoted reel arms 8, the king bolt or pivot pin 6 extending through the base plate and the turn plate, the spring 13 mounted on the king bolt or pivot pin, and the set nut 14 for adjusting the tension of the spring to increase or diminish the friction between the turn plate and the base plate so that the wire may be unreeled with greater or less freedom, substantially as described.

3. A wire reel for fence machines, consisting of a base plate 1 having sockets 2, the folding supporting arms 3 pivoted to the sockets of the base plate, the turn plate 5 resting on the base plate and provided with sockets 7, the reel arms 8 pivoted to the sockets of the turn plate, the king bolt or pivot pin 6 extending through the base plate and the turn plate, the spring 13 mounted on the king bolt or pivot pin, and the set nut 14 for adjusting the tension of the spring to increase or diminish the friction between the turn plate and the base plate, substantially as and for the purpose described.

In testimony whereof I have hereunto set my hand.

HENRY D. ROBINSON.

Witnesses:
CHARLES L. SHEETZ,
LESTER TURNER.